United States Patent [19]

Tucker

[11] Patent Number: 4,538,020

[45] Date of Patent: Aug. 27, 1985

[54] DEVICE TO SEPARATE WIRES TO BE ENCAPSULATED IN A CONNECTOR

[75] Inventor: Donald Tucker, Mountain View, Calif.

[73] Assignee: Raychem Corporation, Menlo Park, Calif.

[21] Appl. No.: 577,106

[22] Filed: Feb. 6, 1984

[51] Int. Cl.[3] .............................................. H02G 3/18

[52] U.S. Cl. ..................................... 174/65 R; 174/76

[58] Field of Search ................... 174/65 R, 76, 81, 82, 174/88 R

[56] References Cited

FOREIGN PATENT DOCUMENTS 145225 2/1952 Australia ........................... 174/77 R 2104736 3/1983 United Kingdom ............. 174/65 R

*Primary Examiner*—A. T. Grimley

*Assistant Examiner*—Morris H. Nimmo

*Attorney, Agent, or Firm*—Stephen C. Kaufman; Timothy H. P. Richardson; Herbert G. Burkard

[57] ABSTRACT

A device for maintaining physical separation between electrical conductors of a cable passing through a connector and for facilitating encapsulation of the conductors in a connector body. The device comprises an insulating platform having a configuration for engaging the connector body, the platform having (1) at least one passageway for passage of a conductor; (2) at least one aperture through which an encapsulant can be dispensed; and (3) at least one opening for allowing air to be voided during an encapsulation process; the platform forming with the connector body a hollow chamber through which at least one conductor passes and into which encapsulant can be dispensed through the aperture. The device further comprises a spline that extends from the platform for locating the device within the connector body; the spline comprising a step portion for resting on the cable and for defining a predetermined separation distance between the cable and the platform.

14 Claims, 4 Drawing Figures

DEVICE TO SEPARATE WIRES TO BE ENCAPSULATED IN A CONNECTOR

TECHNICAL FIELD

The present invention relates to electrical cable and in particular, a device to maintain the separation of the cable conductors and to facilitate their encapsulation in a connector.

INTRODUCTION TO THE INVENTION

It is often necessary to terminate an electrical cable e.g. a heating cable at a junction box. As part of the termination process, the cable conductors and ground are typically first stripped of their insulation and then inserted into a power connector. An encapsulant is thereafter injected into the power connector and finally, the power connector is connected to the junction box.

Throughout the termination process it is desirable (1) to maintain an appropriate physical separation distance amongst the exposed conductors, ground and power connector housing and (2) provide an adequate spatial cavity in which the conductors and ground may be encapsulated. In some countries, regulations have been promulgated which exactly articulate these quantities. A typical regulation, for example, is that there be a 2 mm minimum separation distance amongst the exposed conductors and ground, and, that there be a 5 mm minimum length of exposed conductor to be encapsulated.

SUMMARY OF THE INVENTION

I have now invented a device that is suitable for maintaining the physical separation between electrical conductors of a cable passing through a connector and for facilitating encapsulation of the conductors in a connector body. The device, moreover, is suitable for use in situations where it is necessary to comply with the aforementioned regulations or their equivalent. The device may be easily installed without tools, and, with minor dimensional changes, is readily adapted for use with many types of cables and connectors.

In one aspect, the present invention provides a device for maintaining physical separation between electrical conductors of a cable passing through a connector and for facilitating encapsulation of the conductors in a connector body, the device comprising:

(a) an insulating platform having a configuration for engaging said connector body, said platform having
  (i) at least one passageway for passage of a conductor;
  (ii) at least one aperture through which an encapsulant can be dispensed; and
  (iii) at least one opening for allowing air to be voided during an encapsulation process; said platform forming with the connector body a hollow chamber through which at least one conductor passes and into which encapsulant can be dispensed through said aperture; and
(b) a spline that extends from said platform for locating said device within said connector body; said spline comprising a step portion for resting on said cable and for defining a predetermined separation distance between said cable and said platform.

In a second aspect, the present invention provides electrical apparatus comprising:

(1) a connector comprising
  (a) an inlet
  (b) an outlet, and
  (c) a chamber between the inlet and the outlet;
(2) an electrical cable which enters the connector through said inlet and which at that point comprises
  (a) at least two conductors, each of said conductors being surrounded by an insulating primary jacket, and
  (b) an outer insulating jacket which surrounds the insulated conductors; a terminal portion of said outer jacket having been removed to form an outer jacket shoulder which lies within the chamber of the connector, and terminal portions of the primary jackets having been removed to form primary jacket shoulders which lie with the chamber of the connector and to expose terminal portions of the conductors which pass through the outlet of the connector;
(3 ) an encapsulant which substantially fills the chamber and which encapsulates the electrical cable within the chamber; and
(4) a conductor separating member which is composed of an insulating material and which comprises
  (a) a platform which engages the outlet of the connector and which comprises
    (i) at least two passageways through which pass said exposed terminal portions of the conductors;
    (ii) at least one aperture through which said encapsulant has been dispensed into the hollow chamber, and
    (iii) at least one opening through which air was voided from the hollow chamber, and
  (b) a spline which extends from the platform into the chamber of the connector and which contacts the outer jacket shoulder of the conductor.

BRIEF DESCRIPTION OF THE DRAWINGS

The invention is illustrated in the accompanying drawings in which.

DETAILED DESCRIPTION OF THE INVENTION

The device of the present invention includes a platform that is preferably composed of an organic polymer or some other insulator. The platform may have a variety of configurations, urations, e.g. circular, triangular, rectangular and may be tapered so that it readily engages a particular connector body when e.g. the platform is firmly wedged by finger pressure into place in the connector body.

The platform is provided with at least one passageway for passage therethrough of a stripped conductor wire, preferably of a diameter to accommodate 22 through 10 gauge wire. A passageway may further include a shoulder or lip portion. This feature helps to secure to the platform insulating tubes that may be installed on the stripped conductor wires, preliminary to their insertion in a junction box. A typical cable may include 3 such wires; in this case, the platform includes 3 passageways. The passageways are arranged about the platform surface so that a preselected minimum distance may be provided amongst the stripped conductor wires as they pass through the platform. For example, a preselected distance set forth in the aforementioned regulations is met by arranging the passageways about the platform surface so that a 2 mm minimum separation distance is provided amongst the stripped conductor wires as they pass through the platform.

The platform is also provided with at least one aperture through which an encapsulant can be dispensed, eg. by way of a plunger or syringe, into a connector body. The platform forms with the connector body a hollow chamber through which at least one conductor passes and into which encapsulant can be dispensed through the aperture. In the encapsulation process, air bubbles are vented through at least one opening provided in the platform. For a three wire cable, for example, it is advantageous to include 3 such openings, symmetrically arranged around an aperture.

The device of the present invention further includes a spline of preselected length that extends from the platform and locates the device within the connector body. The spline includes a step portion interposed between the cable and the platform for providing a preselected distance between the cable and the platform. This preselected distance corresponds to the length of stripped conductor wire between the cable and platform. Accordingly, in order to comply with the aforementioned regulations, for example, the preselected distance is a minimum of 5 mm .

The step portion also functions to locate stripped conductor wires vertically with respect to the platform and to maintain physical separation between the stripped wires. The step portion may further include a divider section for maintaining three dimensional physical separation amongst a plurality of stripped wires.

Figure 1:
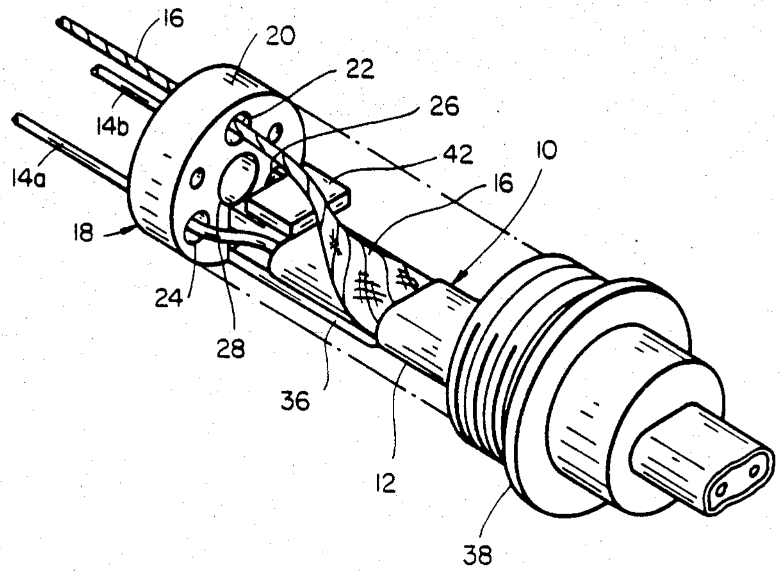
FIG. 1 is a perspective view of the device of the present invention.
Figure 2A:
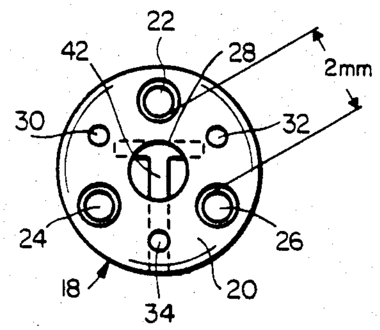
FIG. 2 is an end view of the device.
Figure 2B:
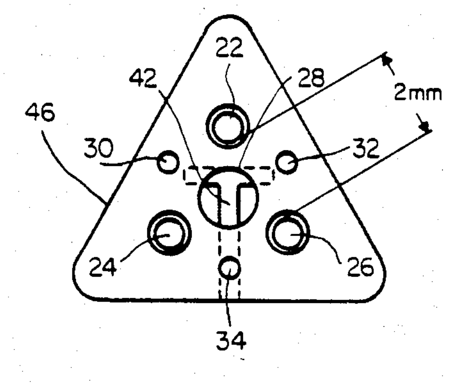
Figure 3:
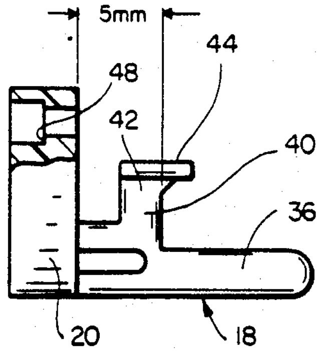
FIG. 3 is a side view of the device.

The invention is illustrated by the following Example, and reference is made to FIGS. 1, 2, 3, which provide perspective, end and side views respectively, of the device of the present invention.

EXAMPLE

A self-regulating heater cable 10 is prepared for connection to a junction box (not shown) by stripping back an insulation layer 12 so as to expose wires 14*a*, *b* and ground 16. The wires 14*a*, *b* and ground 16 are routed through a device that includes plastic insulating platform 20. The platform 20 has a circular configuration, as shown in FIG. 2A, of 2.02 cm diameter and has three passageways at location 22, 24 and 26 for receiving the wires 14*a*, *b* and ground 16. Shown in FIG. 2B is a platform having a triangular shape 46. The locations 22, 24 and 26 are arranged symmetrically about the periphery of the platform 20 and provide a 2 mm separation distance between the wires and ground. The passageways can include shoulder 48. The platform 20 also has one aperture at its center 28 through which an encapsulant can be dispensed, and three openings symmetrically and alternately arranged about the passageways at locations 30, 32 and 34 for allowing air to be voided during an encapsulation process.

A spline 36, 2 cm in length, extends from platform 20 and locates the device 18 within a connector 38 that engages the device 18. A suitable connector is the Polymatrix Connector available from Raychem Corporation, Menlo Park, California. The connector 38 and platform 20 form a hollow chamber through which the wires 14*a*, *b* and ground 16 pass and into which a conventional encapsulant (not shown) can be dispensed through the aperture. Air that is voided by the encapsulant escapes through openings 30, 32 and 34 and through a hollowed portion of the spline 36 at a location 40 (FIG. 3).

The spline 36 includes a step portion 42. The distance from the step portion 42 to the platform is 5 mm. The step portion 42 terminates in a divider section 44 that functions to maintain the wires 14*a*, *b* and ground 16 at a 2 mm separation distance from each other and the inside wall of the connector 38.

I claim:

1. A device for maintaining physical separation between electrical conductors of a cable passing through a connector and for facilitating encapsulation of said conductors in a connector body, said device comprising:

(a) an insulating platform having a configuration for engaging a connector body, said platform having
  (i) at least one passageway for passage of a conductor;
  (ii) at least one aperture through which an encapsulant can be dispensed; and
  (iii) at least one opening for allowing air to be voided during an encapsulation process;
  said platform, when engaged with a connector body, forming therewith a hollow chamber through which at least one conductor passes and into which encapsulant can be dispensed through said aperture; and
(b) a spline that extends from said platform for locating said device within a connector body; said spline comprising an extended step portion for resting on a cable and for defining a predetermined separation distance between a cable and said platform.

2. A device as recited in claim 1, wherein said extended step portion of said spline further comprises a divider section for maintaining three dimensional physical separation amongst a plurality of electrical conductors.

3. A device as recited in claim 1, wherein said platform has a circular shape.

4. A device as recited in claim 3, wherein said platform has three passageways and three openings.

5. A device as recited in claim 4, wherein said passageways and openings are positioned in an alternating configuration around said circular platform.

6. A device as recited in claim 5, wherein said spline is hollow to facilitate the voiding of air during an encapsulation process.

7. A device as recited in claim 1, wherein said device is composed of an organic polymer.

8. A device as recited in claim 1, wherein said device is composed of a rubber.

9. A device as recited in claim 1, wherein said passageway comprises a shoulder.

10. A device as recited in claim 1, wherein said platform has a triangular configuration.

11. Electrical apparatus comprising (1) a connector comprising
  (a) an inlet
  (b) an outlet, and
  (c) a chamber between the inlet and the outlet;
(2) an electrical cable which enters the connector through said inlet and which at that point comprises (a) at least two conductors, each of said conductors being surrounded by an insulating primary jacket, and (b) an outer insulating jacket which surrounds the insulated conductors; a terminal portion of said outer jacket having been removed to form an outer jacket shoulder which lies within the chamber of the connector, and terminal portions of the primary jackets having been removed to form primary jacket shoulders which lie with the chamber of the connector and to expose terminal portions of the conductors which pass through the outlet of the connector;

(3) an encapsulant which substantially fills the chamber and which encapsulates the electrical cable within the chamber; and (4) a conductor separating member which is composed of an insulating material and which comprises (a) a platform which engages the outlet of the connector and which comprises (i), at least two passageways through which pass said exposed terminal portions of the conductors;

(ii) at least one aperture through which said encapsulant has been dispensed into the hollow chamber, and (iii) at least one opening through which air was voided from the hollow chamber, and (b) a spline which extends from the platform into the chamber of the connector and which contacts the outer jacket shoulder of the conductor, the spline comprising an extended step portion for resting on the cable and for defining a predetermined separation distance between the cable and the platform.

12. An apparatus according to claim 11, wherein said conductors are maintained at least at a 2 mm separation distance from each other.

13. An apparatus according to claim 11, wherein the predetermined separation distance from the platform to the cable corresponds to a transition area wherein exposed conductors of at least 5 mm length may be encapsulated.

14. An apparatus according to claim 11, wherein the extended step portion of the spline locates the conductors vertically with respect to the platform and maintains physical separation between conductors.

* * * * *